Oct. 30, 1928.
W. F. STIMPSON
1,689,976
BEAM SCALE
Filed Nov. 18, 1927
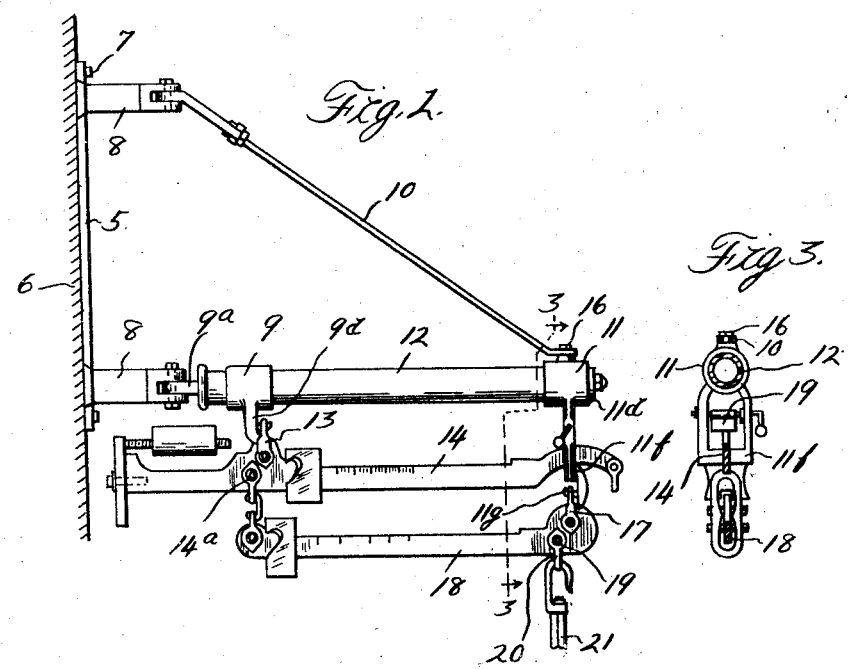
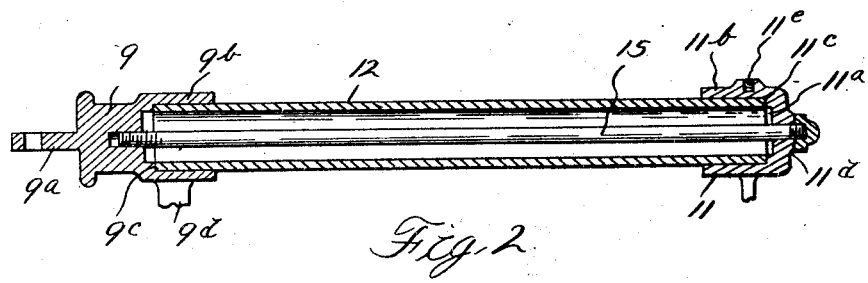
Inventor
Walter F. Stimpson
By Swan, Frye & Murray
Attorneys Patented Oct. 30, 1928.

1,689,976

UNITED STATES PATENT OFFICE.

WALTER F. STIMPSON, OF LOUISVILLE, KENTUCKY.

BEAM SCALE.

Application filed November 18, 1927. Serial No. 234,118.

This invention relates to beam scales, and more particularly to that type of beam scale wherein a weighing beam is suspended from a swinging frame whereby the frame and beam may be arranged at right angles to a wall or other suitable support while it is being used, and when not in use, may be swung into a position parallel with the wall. A weighing scale of this type is shown in my prior Patent No. 1,006,414, patented October 17, 1911, and the present disclosure has been made as an improvement thereto.

One of the objects of the present invention is the provision of simple and effective means for positively positioning the pivot supports of the scale beams. In my prior patent the pivot supports consisted of hangers having portions surrounding and adjustably movable upon a cylinder forming a part of a swinging frame, these hangers being adjusted along the cylinder until they reach the proper position and then being secured by means of wedges or other suitable fastening means. End caps were provided for closing the ends of the cylinder, but had no function in the weighing operation or supporting of the scale beam. The present invention does away with the adjusting of the beam hangers along the cylinder and utilizes the end caps as supports for the weighing beams, provision being made for spacing the end caps appropriate distances to secure desired leverage effects.

Another object of my invention is the arrangement of hanger supports for the scale beams upon cap castings of comparatively greater strength and provided with collar portions in their adjacent extremities, the collars being provided with internal shoulders accurately machined for engaging the opposite ends of a spacing sleeve, the ends of the sleeve being also accurately machined to insure suitable engagement with the shoulders and definite lengths between the castings. A tie bar is arranged to force the shoulders of the castings against the ends of the spacer sleeve and maintain the desired contact of such portions. Moreover, each of the castings is directly connected with the wall bracket to provide support for the weigh beams closely adjacent their pivot supports.

Other objects and advantages will be apparent from the following description, wherein reference is made to the accompanying drawings illustrating a preferred embodiment of my invention and wherein similar reference numerals designate similar parts throughout the several views.

In the drawings:

Figure 1 is a side elevation of my improved scale.

Figure 2 is a longitudinal sectional view through the cap castings and spacer sleeve, and Figure 3 is a cross section taken substantially on the line 3—3 of Figure 1.

Referring now to the drawings, the numeral 5 designates a suitable wall bracket secured to the wall 6 or other support, as by screws 7 or the like. A pair of spaced lugs 8 are provided adjacent the top and bottom of the wall bracket, extending outwardly therefrom and terminating in spaced apertured ears forming parts of the hinge members respectively connecting with one of the cap castings 9 and a tension rod 10 connected to the other cap casting 11 substantially as shown in Figure 1. The cap casting 9 is formed with an apertured end lug $9^a$ fitting between the ears of the lower bracket lug 8 and with a hollow collar portion $9^b$ for the reception of one extremity of a spacer sleeve 12 (note Figure 2), the collar $9^b$ having adjacent its inner end a shoulder $9^c$ forming an abutment for the end of the sleeve 12. The end of the sleeve 12 as well as the contacting face of the shoulder $9^c$ may be machined to provide an accurate fit between the abutting parts, and the inner periphery of the collar $9^b$ may also be machined to snugly fit upon the exterior of the sleeve 12. Depending from the cap casting 9 is a hook $9^d$ forming the support for the loop 13 in which the weighing beam 14 is fulcrumed. The hook $9^d$ may also be provided with side portions arranged to limit the extent of movement of the loop 13 when the swinging frame or scale beam is being moved.

The cap casting 11 is preferably formed substantially as shown with a centrally apertured end wall $11^a$ and a collar portion $11^b$ carrying interiorly a shoulder $11^c$ for abutment against the adjacent extremity of the spacer sleeve 12, the end face of the sleeve and the contacting face of the shoulder 11ᶜ being accurately machined. Also the interior of the collar portion 11ᵇ may be machined to snugly fit over the exterior of the sleeve 12. Through the central aperture of the end face 11ᵃ of the casting 11 extends an elongated bolt or tie bar 15 adapted to thread into a threaded socket in the body portion of the cap casting 9 after extending longitudinally through the spacer sleeve 12 and the collar portions of both cap castings. The bolt 15 is turned until the shoulders 9ᶜ and 11ᶜ are brought into suitable engagement with the ends of the spacer sleeve 12, after which the head of the bolt or tie bar 15 may be pinned or otherwise suitably locked in position to maintain the desired contact between the cap castings and spacer sleeve. The end face 11ᵃ of the casting 11 is preferably provided with an outwardly extending neck 11ᵈ, the outer face of which may be readily machined for engagement with the head of the bolt 15 to insure alignment of the bolt head and casting. The upper portion of the end casting 11 is also preferably formed with a threaded socket 11ᵉ for the reception of a pivot bolt 16 extending through an aperture in the outer extremity of the tension or truss bar 10 connecting the cap casting 11 with the upper lug 8 of the wall bracket.

Depending from the cap casting 11 is an apertured shank 11ᶠ forming a trig loop for the free extremity of the scale beam 14. Below this apertured portion, the shank 11ᶠ terminates in a hook 11ᵍ forming a support for the loop 17 in which is supported the fulcrum pivots of the lower scale beam 18. Suitable side members may also be provided adjacent the hook 11ᵍ to limit the oscillation of the loop 17, and if desired, the trig loop portion 11ᶠ of the shank may also carry the usual pivoted member 19 for locking the scale beam 14 against operation whenever desired.

The scale beams may have any desired arrangement, the illustrated arrangement being merely for purposes of exemplification. In the illustrated embodiment, the upper or main scale beam 14 is a lever of the first class having knife-edged fulcrum pivots engaging with the bearings in the loop 13 supported on the hook of the cap casting 9, and also being provided with knife-edged pivots 14ᵃ between the fulcrum pivots and the wall at any desired distance. From the pivot 14ᵃ is suspended through the medium of pivot bearing loops and an intermediate connecting loop the auxiliary or lower beam 18, which is shown as a lever of the third class with its fulcrum pivots bearing upon the loop 17 supported upon the hook 11ᵍ of the cap casting 11. The opposite end of the auxiliary beam 18 carries pivots engaging with the lowermost loop of the loops suspended from the pivot 14ᵃ of the main beam, and between these pivots of the auxiliary beam is arranged a third pivot 19 with its knife-edges extending upwardly and carrying a loop 20 from which is suspended a meat hook 21 or other suitable commodity receiver of the usual type. Obviously the distances between pivots on the main and auxiliary beams may be varied to secure desired load offsetting capacities of the poises slidable thereon in the usual manner of beam scales. Also it will be apparent that the distances between the fulcrum pivots of the main and auxiliary beams may be changed at will by interposing spacer sleeves 12 of different lengths between the cap castings 9 and 11.

What I claim is:

1. In a support for a beam scale, a sleeve, a pair of cap castings encircling the ends of the sleeve and provided with shoulders respectively contacting the end faces of the sleeve, and means carried by the castings for suspending the scale beams.

2. In a support for a beam scale, a sleeve, a pair of cap castings encircling the ends of the sleeve and provided with shoulders respectively contacting the end faces of the sleeve, a tie bar arranged to maintain the shoulders and sleeve ends in engagement, and means carried by the castings for suspending the scale beams.

3. In a support for a beam scale, a sleeve, a pair of cap castings encircling the ends of the sleeve and provided with shoulders respectively contacting the end faces of the sleeve, a tie bar extending through the sleeve and arranged to maintain the shoulders and sleeve ends in engagement, and means carried by the castings for suspending the scale beams.

4. In a support for a beam scale, a sleeve, a pair of cap castings encircling the ends of the sleeve and provided with shoulders respectively contacting the end faces of the sleeve, one of said castings having a threaded socket substantially centrally of its shoulder, a tie bar extending through the sleeve and one casting and threading into said socket in the other casting for maintaining said shoulders and sleeve ends in engagement, and means carried by the castings for suspending the scale beams.

5. In a support for beam scales, a wall bracket having a pair of lugs provided with apertured spaced ears, a cap casting having an apertured lug extending between the ears of one of said lugs and a collar portion having an internal shoulder, a second casting having a collar portion provided with an internal shoulder, means for pivotally connecting the second casting with the other lug of the wall bracket, a spacer sleeve having its extremities extending into the collar portions of said castings and engaging said shoulders, means for maintaining the shoulders and sleeve ends in engagement, and means carried by the castings for suspending the scale beams.

6. In a support for beam scales, a sleeve, a pair of cap castings having collar portions encircling the ends of the sleeve and provided with internal shoulders for engaging the end faces of the sleeve, and means for maintaining the sleeve ends and said shoulders in engagement, the castings carrying hooks for suspending scale beams.

In witness whereof I hereunto set my hand.

WALTER F. STIMPSON.